United States Patent
Qi et al.

(10) Patent No.: US 8,318,119 B2
(45) Date of Patent: Nov. 27, 2012

(54) METHOD FOR PREPARING PEROVSKITE OXIDE-BASED CATALYST PARTICLES

(75) Inventors: Gongshin Qi, Troy, MI (US); Wei Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/971,822

(22) Filed: Dec. 17, 2010

(65) Prior Publication Data

US 2012/0157301 A1    Jun. 21, 2012

(51) Int. Cl.
*C01F 17/00* (2006.01)
(52) U.S. Cl. .................................... 423/263; 502/303
(58) Field of Classification Search ............... 423/263; 502/303
See application file for complete search history.

(56) References Cited

U.S. PATENT DOCUMENTS

| | | | | |
|---|---|---|---|---|
| 5,549,850 | A | * | 8/1996 | Garrigus .................. 252/519.15 |
| 5,939,354 | A | | 8/1999 | Golden |
| 7,601,325 | B2 | | 10/2009 | Tanaka et al. |
| 2010/0229533 | A1 | * | 9/2010 | Li et al. .......................... 60/274 |

FOREIGN PATENT DOCUMENTS

| | | | |
|---|---|---|---|
| CN | 1162623 | * | 10/1997 |
| CN | 101269839 | * | 9/2008 |
| CN | 101870498 | * | 10/2010 |

OTHER PUBLICATIONS

Kim et al., Strontium-Doped Perovskites Rival Platinum Catalysts for Treating NOx in Simulated Diesel Exhuast; Science 327 (2010), pp. 1624-1627.
Khazaei et al., Effect of citric acid concentration as emulsifier on perovskite phase formation of nano-sized $SrMnO_3$ and $SrCoO_3$ samples; Cryst. Res. Technol. 45, No. 10, pp. 1064-1068 (2010).
Arendt et al., Structuration of $LaMnO_3$ perovskite catalysts on ceramic and metallic monoliths: Physio-chemical characterisation and catalytic activity in methane combustion; Science Direct, Applied Catalysis A: General 339, pp. 1-14 (2008).
Alifanti et al., Activiity in methane combustion and sensitivity to sulfur poisoning of $La_{1-x}Ce_xMn_{1-y}Co_yO_3$ perovskite oxides; Science Direct, Applied Catalysis B: Environmental 41, pp. 71-81 (2003).
Tanaka et al., Advances in designing perovskite catalysts; Current Opinion in Solid State and Materials Science 5 (2001) pp. 381-387.
U.S. Appl. No. 12/571,606, filed Oct. 1, 2009, Washcoating Technique for Perovskite Catalyst, Chang H. Kim.

* cited by examiner

*Primary Examiner* — Steven Bos
(74) *Attorney, Agent, or Firm* — BrooksGroup

(57) ABSTRACT

A high-surface area fine particle dispersal of $LaMnO_3$ or a promoted derivation of $LaMnO_3$ may be prepared by the citrate method. The amount of citric acid used to complex the constituent metal cations into citrate complexed mixed metal compounds may range from about 40 mol % to about 100 mol % in excess of stoichiometry.

19 Claims, 2 Drawing Sheets

METHOD FOR PREPARING PEROVSKITE OXIDE-BASED CATALYST PARTICLES

TECHNICAL FIELD

The technical field of this disclosure relates generally to methods for preparing high-surface area perovskite oxide catalyst particles.

BACKGROUND

A hydrocarbon-fueled engine may combust a mixture of air and fuel to drive mechanical equipment and perform work. The hot exhaust gas generated by the engine generally contains unwanted gaseous emissions and possibly some suspended particulate matter that may need to be converted to more innocuous substances before being discharged to the atmosphere. The gaseous emissions primarily targeted for removal include carbon monoxide, unburned and partially burned hydrocarbons (HC's), and nitrogen oxide compounds ($NO_X$) comprised of NO and $NO_2$ along with nominal amounts of $N_2O$. An exhaust aftertreatment system that includes specially catalyzed flow-through components may be employed to dynamically treat a continuous exhaust flow with variable concentrations of these emissions. Many different exhaust aftertreatment system designs have been developed. But in general these systems seek to oxidize both carbon monoxide and HC's (to carbon dioxide and water) and reduce $NO_X$ (to nitrogen and water). Suspended particulate matter, if present, is usually captured by a filter and burned off at regular intervals.

The catalytic conversion efficiency of carbon monoxide, HC's, and $NO_X$ over various types of catalysts depends largely on the air to fuel mass ratio of the mixture of air and fuel fed to the engine. A stoichiometric mixture of air and fuel (air to fuel mass ratio of about 14.7 for standard petrol-based gasoline) combusts to provide the exhaust flow with a reaction balance of oxidants ($O_2$ and $NO_X$) and reductants (CO, HC's, and $H_2$). This type of exhaust flow composition is generally the easiest to treat. A conventional three-way-catalyst (TWC) that includes a platinum group metal mixture dispersed on a base metal oxide support material, for example, can simultaneously reduce $NO_X$ and oxidize carbon monoxide and HC's through various coupled catalytic reactions. But a stoichiometric mixture of air and fuel is not always maintained or even practical (i.e., a diesel engine). The engine may, for instance, combust a lean mixture of air and fuel (air to fuel mass ratio above 14.7 for standard petrol-based gasoline) to achieve more efficient fuel economy. The excess air contained in a lean mixture of air and fuel increases the concentration of uncombusted oxygen and decreases the concentrations of the various reductants in the exhaust flow. The catalytic reduction rate of $NO_X$ to $N_2$ is slowed in such an oxidative environment over a conventional TWC and may require an entirely different system design or supplemental $NO_X$ treatment capacity to decrease $NO_X$ concentrations to acceptable levels.

The two most prevalent approaches, to date, for reducing $NO_X$ in an oxygen enriched exhaust flow are a selective catalytic reduction (SCR) system and a lean $NO_X$ trap (LNT). A SCR system introduces a reductant such as ammonia or a hydrocarbon into the exhaust flow which, in turn, reacts with $NO_X$ in the presence of oxygen over a reaction-specific SCR catalyst to form nitrogen. A LNT directs the exhaust flow over a $NO_X$ absorption catalyst that stores $NO_X$ as a nitrate species until purged with a source of reductants that also converts the absorbed $NO_X$ into nitrogen over a $NO_X$ reduction catalyst.

The overall $NO_X$ conversion efficiency for both practices can be enhanced by decreasing the molar ratio of NO to $NO_2$ in the $NO_X$ constituency originally produced by the engine and contained in the exhaust flow. The $NO_X$ gas constituency generated by the engine, when combusting a lean mixture of air and fuel, generally constitutes greater than 90 mol % NO and less than 10 mol % $NO_2$. A preferred $NO/NO_2$ molar ratio for rapid $NO_X$ reduction is approximately 1.0 (equimolar). For this reason, an oxidation catalyst that promotes NO oxidation to $NO_2$ is usually provided within or in front of the SCR catalyst or the $NO_X$ absorption catalyst to boost $NO_X$ reduction activity in the SCR system or the LNT, respectively.

Perovskite oxides are a broad class of non-noble mixed metal oxide compounds that can facilitate NO oxidation. The crystalline lattice of perovskite oxides can accommodate different lattice defects that often create oxygen vacancies. These oxygen vacancies, without being bound by theory, are believed to contribute significantly to the perovskite oxide's NO oxidative activity as oxygen contained in the exhaust flow disassociates to fill those vacancies leaving behind residual oxygen radicals that quickly attack NO. Perovskite oxides are defined generally by an $ABO_3$ crystal structure in which a larger, centrally located "A" cation and smaller, surrounding "B" cations coordinate with twelve and six oxygen anions, respectively. Small amounts of the "A" and "B" cations may be substituted with different yet similarly sized "A1" and "B1" promoter cations to provide a supercell crystal structure similar to the general $ABO_3$ crystal structure but defined by the formula $A_{1-x}A1_xB_{1-y}B1_yO_3$. Several specific perovskite oxides that have shown promise as an oxidation catalyst—taking into consideration NO oxidation activity and hydrothermal durability—are $LaMnO_3$ and strontium and cerium promoted supercell variations of that perovskite oxide having the general formulas $La_{1-x}Sr_xMnO_3$ and $La_{1-x}Ce_xMnO_3$, respectively, with X ranging from 0.01 to 0.50 in each instance. A more in-depth discussion of perovskite oxide catalysts can be found in Arendt et al., "Structuration of $LaMnO_3$ perovskite catalyst on ceramic and metallic monoliths: Physico-chemical characterization and catalytic activity in methane combustion," *Applied Catalysts*, A: General 339 (2008), pp. 1-14.

Perovskite oxides including $LaMnO_3$ and its promoted derivations may be dispersed as fine particles and optionally supported on a base metal oxide or some other suitable support material to optimize the oxide's accessible surface area and achieve the most effective oxidation of NO to $NO_2$. A variety of preparation methods have been developed that purport to maximize the oxidative catalytic activity of perovskite oxide particle dispersions. Research into perovskite oxides and their methods of preparation is nonetheless still ongoing and, in fact, has picked-up as the catalyst and exhaust treatment industries seek alternatives to the expensive platinum group metals that have conventionally been used to formulate oxidation catalysts.

SUMMARY

A high-surface area fine particle dispersal of $LaMnO_3$ or a promoted derivation of $LaMnO_3$ may be prepared by the citrate method. The amount of citric acid used to complex the constituent metal cations into citrate complexed mixed metal compounds may range from about 40 mol % to about 100 mol % in excess of stoichiometry. This particular range of excess citric acid is believed to promote porosity and surface morphological effects that increase the accessible surface area of the perovskite oxide particles without deteriorating perovskite crystal phase selectivity in favor of other oxide forms.

The higher surface area achieved, in turn, is believed responsible for improved NO to $NO_2$ oxidation efficiency of the perovskite oxide particles when compared to similar particles formed with a lesser conventional amount of citric acid.

DETAILED DESCRIPTION

Figure 1:
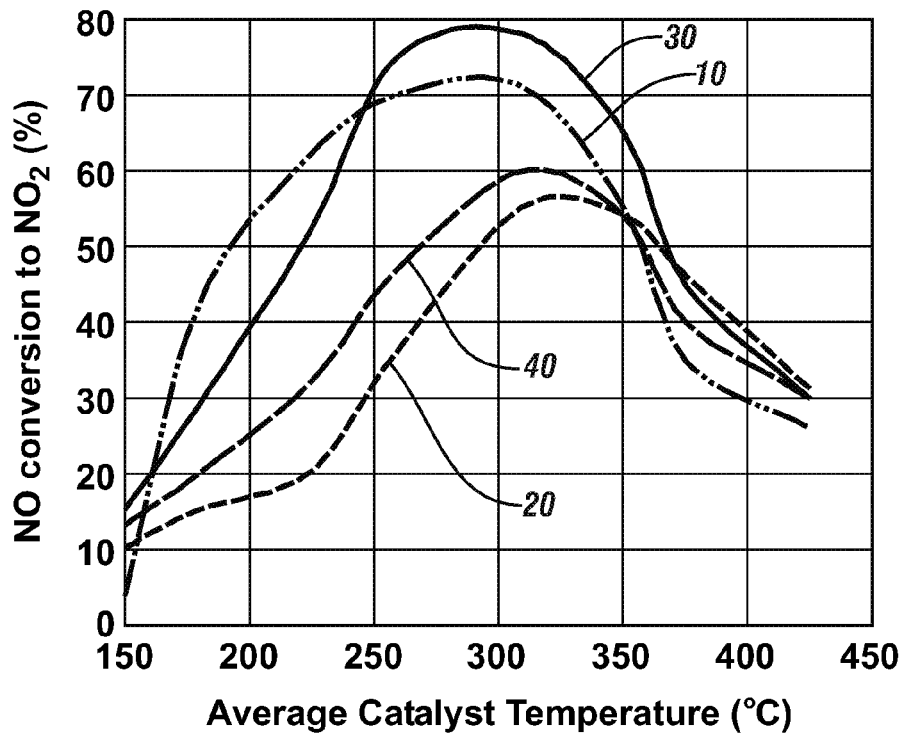
FIG. 1 is a graph that compares the NO to $NO_2$ oxidation activity of three $LaMnO_3$ particle dispersals and a commercially available platinum-based oxidation catalyst when exposed to a gas flow, at a gas hourly space velocity of about 30,000 $h^{-1}$, that comprised 10 vol. % $O_2$, 100 ppmv NO, and the balance $N_2$. The three $LaMnO_3$ particle dispersals and the platinum-based oxidation catalyst were each placed, as a powder sample, in a tube reactor between quartz clogs and hydrothermally aged before receiving the gas flow. The three $LaMnO_3$ particle dispersals were each prepared with a different excess amount of citric acid above stoichiometry. The excess amounts of citric acid above stoichiometry used to prepare the $LaMnO_3$ particle dispersals were 10 mol % (identified as numeral 20), 60 mol % (identified as numeral 30), and 100 mol % (identified as numeral 40).

Perovskite oxides that are expected to be used as catalyst particles may be formed by the citrate method. One of the beginning steps of the citrate method is the complexation of the constituent "A" and "B" metal cations with citric acid. This usually involves mixing citric acid and precursor constituent metal salts in water to form an aqueous liquid medium. The precursor constituent metal salts dissociate and provide the "A" and "B" cations at the desired molecular ratio. The amount of citric acid included in the aqueous liquid medium has conventionally ranged anywhere from a stoichiometric amount to a roughly 10 mol % excess. A stoichiometric amount of citric acid is the amount that provides a stoichiometric quantity of functional carboxyl groups (2 per citric acid molecule) and constituent metal cations.

A high-surface area fine particle dispersal of $LaMnO_3$ may be prepared by the citrate method with a larger quantity of citric acid. The amount of citric acid used to complex the lanthanum and manganese metal cations ranges from about 40 mol % to about 100 mol % in excess of stoichiometry. The prepared $LaMnO_3$ particles have demonstrated a better NO oxidation activity than $LaMnO_3$ particles formed with a lesser conventional amount of citric acid. The higher excess amount of citric acid (i.e., 40-100 mol % in excess of stoichiometry) is believed to induce porosity and surface morphological effects that increase the accessible surface area of the $LaMnO_3$ particles and, in turn, promote more rapid NO oxidation to $NO_2$.

The same method may also be used to achieve similar NO oxidation gains in promoted derivations of $LaMnO_3$. These perovskite oxides have the same general $ABO_3$ crystal structure as $LaMnO_3$ but substitute a promoter constituent metal cation for lanthanum and, as such, are defined by the general formula $La_{1-X}A1_XMnO_3$ with X ranging from about 0.01 to about 0.50. The A1 promoter cation may, for example, be Sr or Ce. A specific example of a promoted derivation of $LaMnO_3$ is $La_{0.9}Sr_{0.1}MnO_3$. The reference to $LaMnO_3$ in the following, more through description of a citrate method according to a preferred embodiment is also applicable to and meant to encompass promoted derivations of $LaMnO_3$ even though not explicitly recited for the sake of brevity.

The $LaMnO_3$ particle dispersal may be formed by the citrate method which comprises, generally speaking, a complexation step, a dehydration step, a combustion step, and a calcination step. These steps describe the general chemical metamorphosis taking place and are usually performed in succession. Their precise beginning and end may not always be discernable. The prepared $LaMnO_3$ particles may then be incorporated into a washcoat solution and applied to a flow-through honeycomb monolith or some other suitable substrate acceptable for use in an exhaust aftertreatment system. The washcoat solution may contain a base metal oxide such as $Al_2O_3$, $CeO_2$, or $CeO_2$—$ZrO_2$ and other fine catalyst particles in addition to the $LaMnO_3$ particles depending on the intended end-use of the catalyst formulation. The additional catalyst particles may comprise platinum group metals (Pt, Pd, Rh), alkali or alkaline earth metal oxides/carbonates (CaO, MgO, BaO, $BaCO_3$, $K_2O$, $K_2CO_3$), a base metal ion-substituted zeolite (Fe and/or Cu substituted β-type, Y-type, or ZSM-5 zeolite), a base metal ion-substituted silicoaluminophosphate (Fe and/or Cu substituted SAPO-5, SAPO-34, SAPO-44), or mixtures thereof.

In the complexation step, citric acid and salts of lanthanum and manganese are dissolved in water to form an aqueous liquid medium. The salts of lanthanum and manganese dissociate and the resultant lanthanum and manganese cations react with the citric acid's carboxyl functional groups to form atomically homogeneous citrate complexed mixed metal compounds. The salts of lanthanum and manganese may be in the form of nitrates. These salt forms are favored because they produce very little, if any, by-product residues when thermally decomposed and, during such thermal decomposition, evolve a relatively large amount of gas which promotes extensive particle surface area and porosity. The mixing conditions associated with forming the citrate complexed mixed metal compounds may vary but, in general, the aqueous based liquid medium is agitated for about 30 minutes to about 3 hours at room temperature.

The aqueous liquid medium may be a water-based solution or emulsion and generally includes enough water to easily dissolve the salts of lanthanum and manganese. The respective amounts of the lanthanum and manganese salts included in the aqueous liquid medium are predetermined to provide an equal molecular amount of lanthanum and manganese cations and to prepare a total desired amount of $LaMnO_3$ particles. One or more promoter cation salts may also be included in the liquid medium if a promoted supercell derivation of $LaMnO_3$ is desired. A molecularly appropriate amount of a strontium nitrate, for example, may be added to produce a $La_{1-X}Sr_XMnO_3$ particle dispersal in which the value of X can be selectively controlled by careful management of the La/Sr dissolved cation ratio.

The amount of citric acid included in the aqueous liquid medium ranges from about 40 mol % to about 100 mol % in excess of the stoichiometric amount required to provide a carboxyl functional group for each dissolved lanthanum and manganese metal cation. This amount can be calculated by dividing the total mols of constituent metal cations (La, Mn, and any promoter cations) expected to be dissolved in the aqueous liquid medium by two and then multiplying that number, first, by the excess mol % factor of 1+E, where E is the desired excess mol % (40-100) divided by 100, and second, by the molecular weight of citric acid (192 g/mol for anhydrous and 210 g/mol for monohydrate), as shown in the following abbreviated equation:

$$\text{Amt citric acid} = \left(\frac{\text{total mols cations}}{2}\right) \times \left[1 + \left(\frac{\text{excess mol \%}}{100}\right)\right] \times (\text{MW citric acid})$$

The particular amount of excess citric acid above stoichiometry, more specifically, may fall within the range of about 40 mol % to about 80 mol %, from about 50 mol % to about 70 mol %, from about 55 mol % to about 65 mol %, and is preferably chosen to be about 60 mol %.

In the dehydration step, the water component of the aqueous liquid medium is removed to concentrate the citrate complexed mixed metal compounds. The resultant semi-anhydrous material is a three-dimensional amorphous gel or syrup that, on a molecular level, is akin to a polymer structure in which the multifunctional citric acid molecules are linked to the constituent metal cations. The water component may be evaporated by heating the liquid medium between about 60° C. and 150° C. at ambient pressure or under a moderate vacuum, with or without agitation, until most of the water is removed. A small amount of nitrate salts, if used to dissolve the lanthanum and manganese cations, may also decompose and evolve from the aqueous liquid medium during dehydration in the form of nitrogen oxides (NO and $NO_2$).

In the combustion step, the amorphous gel is thermally decomposed into a brittle, dry, and porous mixed metal oxide particle mass. The thermal decomposition of the amorphous gel burns off both the residual nitrates and the citrate portion of the citrate complexed mixed metal compounds. The resultant mixed metal oxides are primarily defined by crystallographic lattice structures that are dissimilar from the $ABO_3$ crystal structure of perovskite oxides. The amorphous gel may be heated, in air, from the temperature achieved during dehydration at a constant rate of, for example, about 2-15° C. per minute, up to a temperature between about 200° C. and 300° C. for about 5 minutes to about 2 hours to effectuate thermal decomposition. The evolution of nitrogen oxide gases (derived from residual nitrates) and normal organic combustion gas products (derived from the citrate portion of the citrate complexed mixed metal compounds) during combustion stimulate porosity and surface morphological characteristics that help refine the resultant mixed metal oxide particle mass into its very delicate, loosely-adhered, fine particle collection. The extra citric acid included in the aqueous liquid medium during the complexation step provides additional gas evolution capacity that is believed to drive the formation of higher surface area mixed metal oxide particles without deteriorating perovskite crystal phase selectivity during calcination in favor of other oxide forms.

In the calcination step, the brittle mixed metal oxide particle mass is crushed and heated to form fine, lightweight, and high surface area $LaMnO_3$ particles. The crushed mixed metal oxide particles may be heated in air to a temperature ranging from about 675° C. to about 1100° C. for about 2 to about 6 hours to crystallographically reconfigure the mixed metal oxide particles into $LaMnO_3$ particles with their ascribed perovskite oxide crystal structure. The exact mechanism by which this crystal lattice reconfiguration proceeds is not entirely understood. Higher calcinations temperatures do, however, generally cultivate the $LaMnO_3$ particles faster than lower calcinations temperatures. The crushed mixed metal oxide particles may, for example, in a preferred embodiment, be heated in static air to a temperature of about 700° C. for a period of about five hours.

After calcination, the $LaMnO_3$ particles may be further refined, if desired, to reduce their size even more before being incorporated into a washcoat solution. Ball milling or any other known particle refinement process may be used to achieve such an objective.

EXAMPLES

These Examples demonstrate the enhanced NO to $NO_2$ catalytic oxidative activity of $LaMnO_3$ catalyst particles that have been prepared with a greater amount of citric acid than has customarily been used.

Example 1

Three fine particle dispersals of $LaMnO_3$ (identified as dispersals A, B, and C) were prepared with varying amounts of citric acid. Each of the $LaMnO_3$ particle dispersals was then prepped with quartz and loaded into a laboratory tube reactor (diameter=6 mm, length=36 mm). Next, each of the powder samples was aged and, afterwards, exposed to a gas flow comprising nitrogen, oxygen, and small amounts of NO. A Fourier Transform Infrared analyzer (Nicolet 380) equipped with a high sensitivity MCT detector was used to continuously analyze the composition of the effluent exiting the reactor after passing through the powder sample. A platinum-based oxidation catalyst aged under the same conditions was also tested in the same manner to provide a comparison benchmark for the $LaMnO_3$ particle dispersals. While this Example evaluates only $LaMnO_3$ particle dispersals, it is expected that the same general results and data would be achieved for promoted derivations of $LaMnO_3$ in which the Mn cation is partially substituted with another cation such as Sr or Ce.

The three fine particle dispersals of $LaMnO_3$ particles (dispersals A-C) were formed by the same general citrate method. For each dispersal, an equimolar amount $La(NO_3)_3$ and $Mn(NO_3)_2$ was dissolved in de-ionized water with citric acid monohydrate. The amount of water used was 46.2 mL per gram of $La(NO_3)_3$. The amount of citric acid added to the de-ionized water in excess of stoichiometry to complex the $La^{3+}$ and $Mn^{2+}$ cations was 10 mol %, 60 mol %, and 100 mol % for dispersals A, B, and C, respectively. The solutions were then set on a stirring and heating plate and stirred for 1 hour at room temperature and, afterwards, heated to 80° C. under continuous stirring to slowly evaporate the water until the solution became a viscous gel. Next, the temperature was ramped up at a rate of 10° C. per minute to further heat the viscous gel and initiate gas evolution. The evolution of NO and $NO_2$ gases began around 150° C. and, when the temperature reached just below 300° C., the citrate ions combusted vigorously and caused a large spike in temperature and powder displacement. The powders were thus covered with several layers of $ZrO_2$ balls to prevent such powder displacement yet still allow for gas mobility. The resulting spongy materials were crushed and calcined at 700° C. for about 5 hours in static air.

Each of the three $LaMnO_3$ particle dispersals and the platinum-based oxidation catalyst was then diluted with quartz at a ratio of 1:9 (particles to quartz) and placed in the middle of the tube reactor between two clogs of quartz wool. The powder catalysts were hydrothermally aged with 10 vol. % $H_2O$ in air for 12 hours at 800° C. followed by a pretreatment with 10 vol. % $O_2$ in $N_2$ at 500° C. for 1 hour. The powder samples were then cooled to around 100° C. at which time the gas flow was initiated. The gas flow comprised 10 vol. % $O_2$, 100 ppmv NO, and the balance $N_2$, and moved through the tube reactor at a gas hourly space velocity of approximately 30,000 $h^{-1}$. The temperature of the gas flow was increased by 10° C. per minute from 100° C. to 450° C. The NO to $NO_2$ oxidative activity of each powder catalyst material was determined based on data obtained from the FT-IR instrument.

Figure 2:
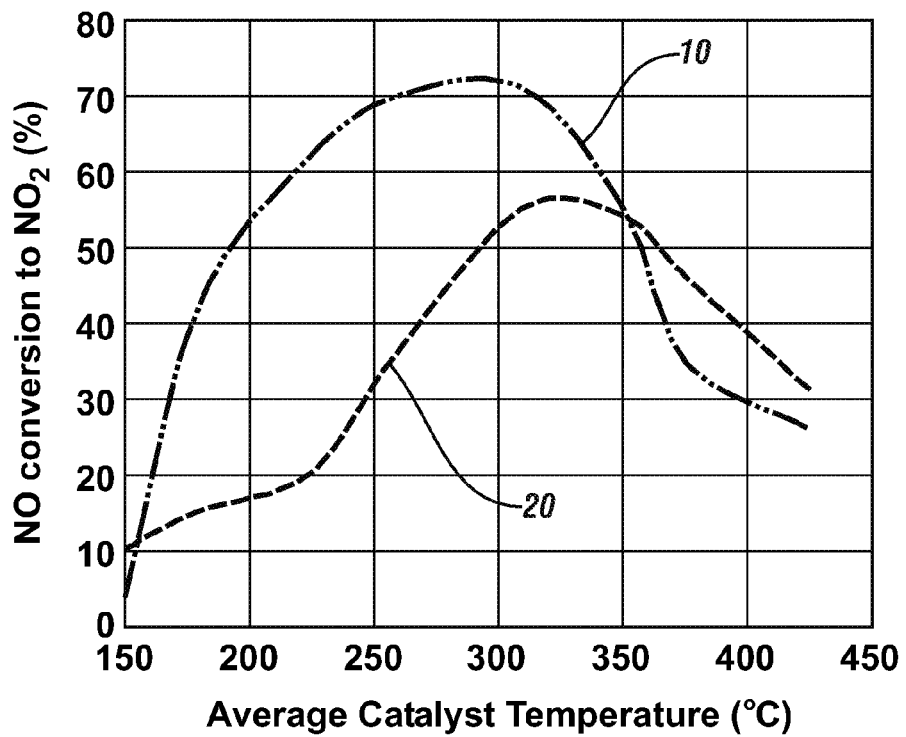
FIG. 2 is a graph that depicts isolated data from FIG. 1. The graph in FIG. 2 compares the NO to $NO_2$ oxidation activity of the $LaMnO_3$ particle dispersal prepared with a 10 mol % excess of citric acid above stoichiometry and the platinum-based oxidation catalyst.
Figure 3:
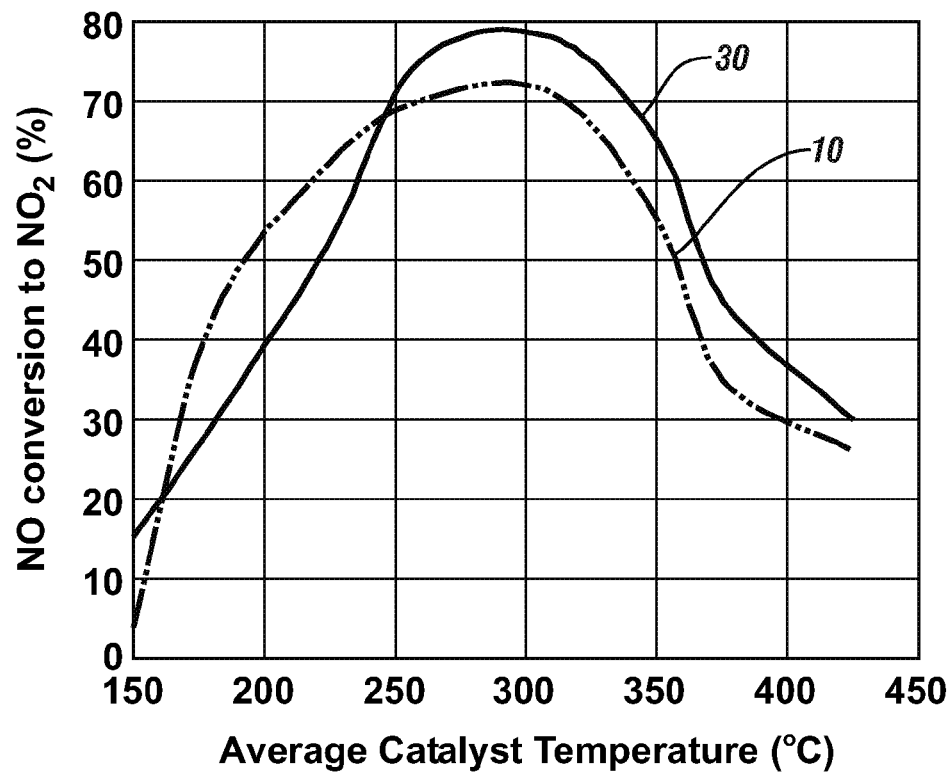
FIG. 3 is a graph that depicts isolated data from FIG. 1. The graph in FIG. 2 compares the NO to $NO_2$ oxidation activity of the $LaMnO_3$ particle dispersal prepared with a 60 mol % excess of citric acid above stoichiometry and the platinum-based oxidation catalyst.

The amount of NO converted to $NO_2$ (%) for each of dispersals A-C and the platinum-based oxidation catalyst are shown in FIG. 1 as a function of average catalyst temperature (° C.). The conversion efficiency of the platinum-based oxidation catalyst is identified as numeral 10 and the conversion efficiency of dispersals A, B, and C are identified as numerals 20, 30, and 40, respectively. FIGS. 2 and 3 are derived from FIG. 1 to provide another viewing perspective. FIG. 2 depicts the NO conversion efficiency of the platinum-based oxidation catalyst (10) and dispersal A (20). FIG. 3 depicts the NO conversion efficiency of the platinum-based oxidation catalyst (10) and dispersal B (30).

As can be seen from FIGS. 1-3, the dispersal of $LaMnO_3$ particles formed with 60 mol % excess citric acid above stoichiometry oxidized NO to $NO_2$ (dispersal B, 30) more effectively than the other two $LaMnO_3$ particle dispersals, especially over the temperature range of 150° C.-350° C. That same $LaMnO_3$ particle dispersal even outperformed the platinum-based oxidation catalyst above 250° C. As for the other two $LaMnO_3$ particle dispersals, they each underperformed the platinum-based oxidation catalyst over the temperature range of 150° C.-350° C. with the dispersal prepared with 100 mol % excess citric acid above stoichiometry (dispersal C) consistently converting about 7-15% more NO to $NO_2$ than the dispersal prepared with 10 mol % excess citric acid above stoichiometry (dispersal A).

Example 2

Two fine particle dispersals of $LaMnO_3$ particles (identified as dispersals D and E) were prepared with a 10 mol % and a 60 mol % excess of citric acid above stoichiometry, respectively, as described above. A fine particle dispersal of $La_{0.9}Sr_{0.1}MnO_3$ (identified as dispersal F) was also prepared with a 60 mol % excess of citric acid above stoichiometry by the citrate method described above except that an appropriate amount of $Sr(NO_3)_2$ was dissolved in the de-ionized water with the $La(NO_3)_3$ and $Mn(NO_3)_2$.

Each of the $LaMnO_3$ particle dispersals and the $La_{0.9}Sr_{0.1}MnO_3$ particle dispersal was then ball milled with 6.33 mL of water per gram of the particles for 18 hours. The slurries were then stirred continuously and 0.33 mL $HNO_3$ (0.1M) per gram of the $LaMnO_3/La_{0.9}Sr_{0.1}MnO_3$ particles and 5 mL of water per gram of the $LaMnO_3/La_{0.9}Sr_{0.1}MnO_3$ particles were added. Each of the resulting solutions was washcoated onto a monolithic honeycomb core sample (diameter=0.75 inch, length=1.0 inch). Next, after washcoating, the deposited $LaMnO_3$ particle dispersals were again dried and calcined at 550° C. for 5 hours in static air (to drive off the washcoat solution).

Each of the three washcoated core samples (prepared from dispersals D, E and F) was then placed in a vertical quartz tubular reactor operated at atmospheric pressure and hydrothermally aged in air with 10 vol. % $H_2O$ for 24 hours at 800° C. before being evaluated. Next, the catalyst materials were exposed to a gas flow comprising nitrogen, oxygen, carbon dioxide, water and small amounts of NO. The gas flow, which was fed by a series of mass flow controllers, maintained a gas hourly space velocity through the core samples of about 25,000 $h^{-1}$ and comprised 10 vol. % $O_2$, 10 vol. % $CO_2$, 5 vol. % $H_2$, 200 ppmv NO, and the balance $N_2$. The reactor was heated in a tube furnace that controlled the temperature just upstream of the core samples. Thermocouples were used to measure the temperatures upstream and downstream of the catalyst. The reactor effluent emerging from the core samples was analyzed with a Fourier Transform Infrared analyzer (ThermoNicolet NEXUS 670) calibrated at 940 Torr and 165° C. The reactor was heated both upstream and downstream of the core samples to 165° C. to assure complete vaporization of the water. The temperature of the gas flow was increased by 10° C. per minute from 100° C. to 450° C. The NO to $NO_2$ oxidative activity of each powder catalyst material was determined based on data obtained from the FT-IR instrument. A pressure controller at the outlet of the FT-IR was used to maintain its calibration pressure.

Figure 4:
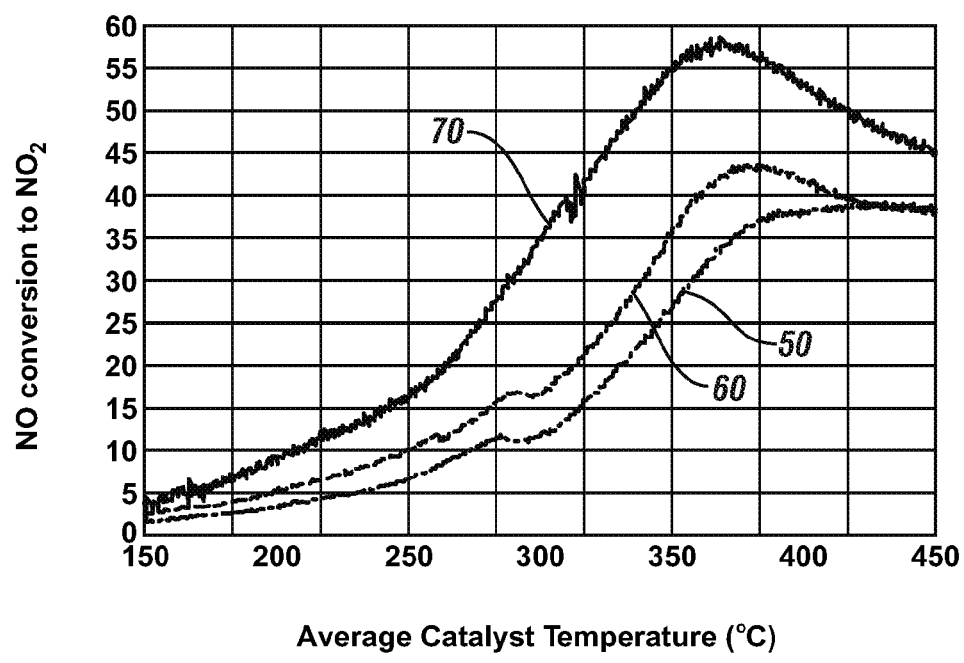
FIG. 4 is a graph that compares the NO to $NO_2$ oxidation activity of two $LaMnO_3$ particle dispersals and one $La_{0.9}Sr_{0.1}MnO_3$ particle dispersal, each supported on a flow-through monolith support structure, when exposed to a gas flow, at a gas hourly space velocity of about 25,000 $h^{-1}$, that comprised 10 vol. % $O_2$, 10 vol. % $CO_2$, 5 vol. % $H_2O$, 200 ppmv NO, and the balance $N_2$. The two $LaMnO_3$ particle dispersals and the $La_{0.9}Sr_{0.1}MnO_3$ particle dispersal were each washcoated onto a flow-through monolith honeycomb core sample, placed in a vertical quartz tube reactor, and hydrothermally aged before receiving the gas flow. The two $LaMnO_3$ particle dispersals were prepared with different excess amounts of citric acid above stoichiometry. The excess amounts of citric acid used were 10 mol (identified as numeral 50) and 60 mol % (identified as numeral 60) above stoichiometry. The $La_{0.9}Sr_{0.1}MnO_3$ particle dispersal was prepared with a 60 mol % excess amount of citric acid above stoichiometry (identified as numeral 70).

The amount of NO converted to $NO_2$ (%) for each of dispersals D-F is shown in FIG. 4 as a function of average catalyst temperature (° C.). The conversion efficiency of dispersals D, E, and F are identified as numerals 50, 60, and 70, respectively. As can be seen, the dispersal of $La_{0.9}Sr_{0.1}MnO_3$ particles formed with a 60 mol % excess of citric acid above stoichiometry oxidized NO to $NO_2$ (dispersal F, 70) more effectively than the two $LaMnO_3$ particle dispersals over the entire temperature range evaluated. The $LaMnO_3$ particle dispersal formed with a 60 mol % excess of citric acid outperformed the $LaMnO_3$ particle dispersal formed with a 10 mol % excess of citric acid pretty consistently (better by about 3-10%) up to about 420° C.

The above description of exemplary embodiments and specific examples are merely descriptive in nature and not intended to limit the scope of the claims that follow.

The invention claimed is:
1. A method comprising:
dissolving precursor constituent metal salts, which comprise salts of Lanthanum and manganese, and an amount of citric acid into water to form an aqueous liquid medium, the precursor constituent metal salts providing dissolved constituent metal cations that react with citric acid to form citrate complexed mixed metal compounds, the amount of citric acid included in the aqueous liquid medium ranging from about 40 mol % to about 100 mol % in excess of that needed to stoichiometrically complex with the dissolved constituent metal cations;
removing water from the aqueous liquid medium to concentrate the citrate complexed mixed metal compounds into an amorphous gel;

converting the citrate complexed mixed metal compounds into perovskite oxide particles having a crystal structure represented by the general formula $La_{1-x}A1_xMnO_3$, wherein A1 is a promoter metal cation and x ranges from about 0 to about 0.5.

2. The method according to claim 1, wherein the amount of citric acid included in the aqueous liquid medium ranges from about 50 mol % to about 70 mol % in excess of that needed to stoichiometrically complex with the dissolved constituent metal cations.

3. The method according to claim 1, wherein the amount of citric acid included in the aqueous liquid medium is about 60 mol % in excess of that needed to stoichiometrically complex with the dissolved constituent metal cations.

4. The method according to claim 1, wherein the salts of lanthanum and manganese are lanthanum nitrate and manganese nitrate, respectively.

5. The method according to claim 1, wherein the precursor constituent metal salts consist of salts of lanthanum and manganese, and wherein the crystal structure of the perovskite oxide particles is represented by the formula $LaMnO_3$.

6. The method according to claim 1, wherein the precursor constituent metal salts further comprise a salt of strontium so that the promoter metal cation is strontium and the crystal structure of the perovskite oxide particles is represented by the formula $La_{1-x}Sr_xMnO_3$ with x ranging from about 0.01 to about 0.50.

7. The method according to claim 6, wherein the salt of strontium is strontium nitrate.

8. The method according to claim 1, wherein the precursor constituent metal salts further comprise a salt of cerium so that the promoter metal cation is cerium and the crystal structure of the perovskite oxide particles is represented by the formula $La_{1-x}Ce_xMnO_3$ with x ranging from about 0.01 to about 0.50.

9. The method according to claim 8, wherein the salt of cerium is cerium nitrate.

10. The method according to claim 1, wherein removing the water from the aqueous liquid medium comprises heating the aqueous liquid medium to a temperature between about 60° C. and 150° C. to evaporate the water.

11. The method according to claim 1, wherein converting the citrate complexed mixed metal compounds into perovskite oxide particles comprises:
thermally decomposing the amorphous gel in air to evolve nitrogen oxide gases and citrate-derived gases, the thermal decomposition of the amorphous gel forming mixed metal oxide particles; and
calcining the mixed metal oxide particles in air to reconfigure the mixed metal oxide particles into the perovskite oxide particles.

12. The method according to claim 11, wherein thermally decomposing the amorphous gel comprises heating the amorphous gel in air up to a temperature between about 200° C. and about 300° C. and maintaining that temperature for a period of about five minutes to about 2 hours.

13. The method according to claim 11, wherein calcining the mixed metal oxide particles comprises heating the mixed metal oxide particles in air at a temperature between about 675° C. and about 1100° C. about 2 hours to about 6 hours.

14. The method according to claim 1, wherein converting the citrate complexed mixed metal compounds into perovskite oxide particles comprises:
heating the amorphous gel in air up to a temperature between about 200° C. to about 300° C. and maintaining that temperature for a period of about five minutes to about 2 hours to form mixed metal oxide particles primarily defined by a crystal structure dissimilar from the perovskite oxide particles; and
heating the mixed metal oxide particles in air at a temperature between about 675° C. and about 1100° C. for about 2 hours to about 6 hours.

15. A method for preparing perovskite oxide particles, the method comprising:
dissolving an amount of citric acid and nitrate salts of lanthanum, manganese, and a promoter metal into water to form an aqueous liquid medium, the nitrate salts providing dissolved cations of lanthanum, manganese, and the promoter metal that react with citric acid to form citrate complexed mixed metal compounds, the amount of citric acid included in the aqueous liquid medium ranging from about 40 mol % to about 100 mol % in excess of that needed to stoichiometrically complex with the dissolved cations of lanthanum, manganese, and the promoter metal;
heating the aqueous liquid medium to a temperature between about 60° C. and 150° C. to evaporate the water and concentrate the citrate complexed mixed metal compounds into an amorphous gel;
heating the amorphous gel in air up to a temperature between about 200° C. and about 300° C. and maintaining that temperature for a period of about five minutes to about 2 hours to form mixed metal oxide particles primarily defined by a crystal structure dissimilar from perovskite oxide particles; and
heating the mixed metal oxide particles in air at a temperature between about 675° C. and about 1100° C. for about 2 hours to about 6 hours to convert the mixed metal oxide particles into perovskite oxide particles having a crystal structure represented by the general formula $La_{1-x}A1_xMnO_3$, wherein A1 is the promoter metal cation and x ranges from about 0.01 to about 0.5.

16. The method according to claim 15, wherein the promoter metal cation is a strontium cation and the perovskite oxide particles have a crystal structure represented by the general formula $La_{1-x}Sr_xMnO_3$.

17. The method according to claim 15, wherein the promoter metal cation is a cerium cation and the perovskite oxide particles have a crystal structure represented by the general formula $La_{1-x}Ce_xMnO_3$.

18. The method according to claim 15, wherein the amount of citric acid included in the aqueous liquid medium ranges from about 50 mol % to about 70 mol % in excess of that needed to stoichiometrically complex with the dissolved cations of lanthanum, manganese, and the promoter metal.

19. The method according to claim 15, wherein the amount of citric acid included in the aqueous liquid medium is about 60 mol % in excess of that needed to stoichiometrically complex with the dissolved cations of lanthanum, manganese, and the promoter metal.

* * * * *